(12) United States Patent
Kamada

(10) Patent No.: US 12,172,473 B2
(45) Date of Patent: Dec. 24, 2024

(54) TIRE

(71) Applicant: BRIDGESTONE CORPORATION, Tokyo (JP)

(72) Inventor: Shiho Kamada, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 355 days.

(21) Appl. No.: 17/598,017

(22) PCT Filed: May 20, 2020

(86) PCT No.: PCT/JP2020/019870
§ 371 (c)(1),
(2) Date: Sep. 24, 2021

(87) PCT Pub. No.: WO2020/246236
PCT Pub. Date: Dec. 10, 2020

(65) Prior Publication Data
US 2022/0169082 A1 Jun. 2, 2022

(30) Foreign Application Priority Data
Jun. 3, 2019 (JP) ................................ 2019-103678

(51) Int. Cl.
*B60C 13/00* (2006.01)

(52) U.S. Cl.
CPC .................................. *B60C 13/001* (2013.01)

(58) Field of Classification Search
CPC ..... B60C 13/00; B60C 13/001; B60C 13/002; B60C 13/02; B60C 13/023
USPC ........................................................... 152/523
See application file for complete search history.

(56) References Cited

U.S. PATENT DOCUMENTS

| 6,053,228 | A | | 4/2000 | Baker | |
|---|---|---|---|---|---|
| D707,621 | S | * | 6/2014 | Tokizaki | ...................... D12/605 |
| D754,596 | S | * | 4/2016 | Tokizaki | ...................... D12/605 |
| 2003/0084979 | A1 | | 5/2003 | Matsumoto | |

(Continued)

FOREIGN PATENT DOCUMENTS

| CN | 103568739 A | 2/2014 |
|---|---|---|
| CN | 107074041 A | 8/2017 |

(Continued)

OTHER PUBLICATIONS

Extended European Search Report dated May 24, 2023, issued in European Application No. 20819082.7.

(Continued)

*Primary Examiner* — Sedef E Paquette
(74) *Attorney, Agent, or Firm* — Sughrue Mion, PLLC

(57) ABSTRACT

In a tire, first and second ridge parts extending in a tire radial direction each have a central portion in the tire radial direction located on an inner side in the tire radial direction with respect to a central portion of the first ridge part in the tire radial direction are provided on an outer surface of a side wall part. A decorative area provided in an outer surface of the side wall part includes a dense area in which the first ridge part and the second ridge part face each other in the tire circumferential direction, and a sparse area in which either the first ridge parts or the second ridge parts face each other in the tire circumferential direction without interposing the other therebetween.

10 Claims, 4 Drawing Sheets

(56) References Cited

U.S. PATENT DOCUMENTS

| | | |
|---|---|---|
| 2012/0055603 A1 | 3/2012 | Tokizaki |
| 2014/0283968 A1 | 9/2014 | Matsumoto |
| 2015/0041037 A1 | 2/2015 | Mukai |
| 2018/0009272 A1 | 1/2018 | Yasunaga |
| 2019/0047331 A1 | 2/2019 | Iwabuchi et al. |
| 2021/0094359 A1* | 4/2021 | Shinzawa ............. B60C 13/001 |

FOREIGN PATENT DOCUMENTS

| | | |
|---|---|---|
| CN | 108602399 A | 9/2018 |
| EP | 0 755 810 A2 | 1/1997 |
| EP | 3 489 040 A1 | 5/2019 |
| JP | 8-282215 A | 10/1996 |
| JP | 8-282219 A | 10/1996 |
| JP | 2001-191745 A | 7/2001 |
| JP | 2003-146025 A | 5/2003 |
| JP | 2004-17828 A | 1/2004 |
| JP | 2004-338655 A | 12/2004 |
| JP | 2012-6531 A | 1/2012 |
| JP | 2012-56416 A | 3/2012 |
| JP | 2014-061820 A | 4/2014 |
| JP | 2014-180947 A | 9/2014 |
| JP | 2015-033983 A | 2/2015 |
| JP | 2018-002112 A | 1/2018 |
| JP | 2018-002113 A | 1/2018 |
| JP | 2018-122751 A | 8/2018 |
| JP | 2019-081514 A | 5/2019 |
| WO | 2018/059751 A1 | 4/2018 |

OTHER PUBLICATIONS

International Search Report of PCT/JP2020/019870 Aug. 4, 2020 [PCT/ISA/210].
Chinese Search Report dated Sep. 21, 2022 in Chinese Application No. 202080038589.8.

* cited by examiner

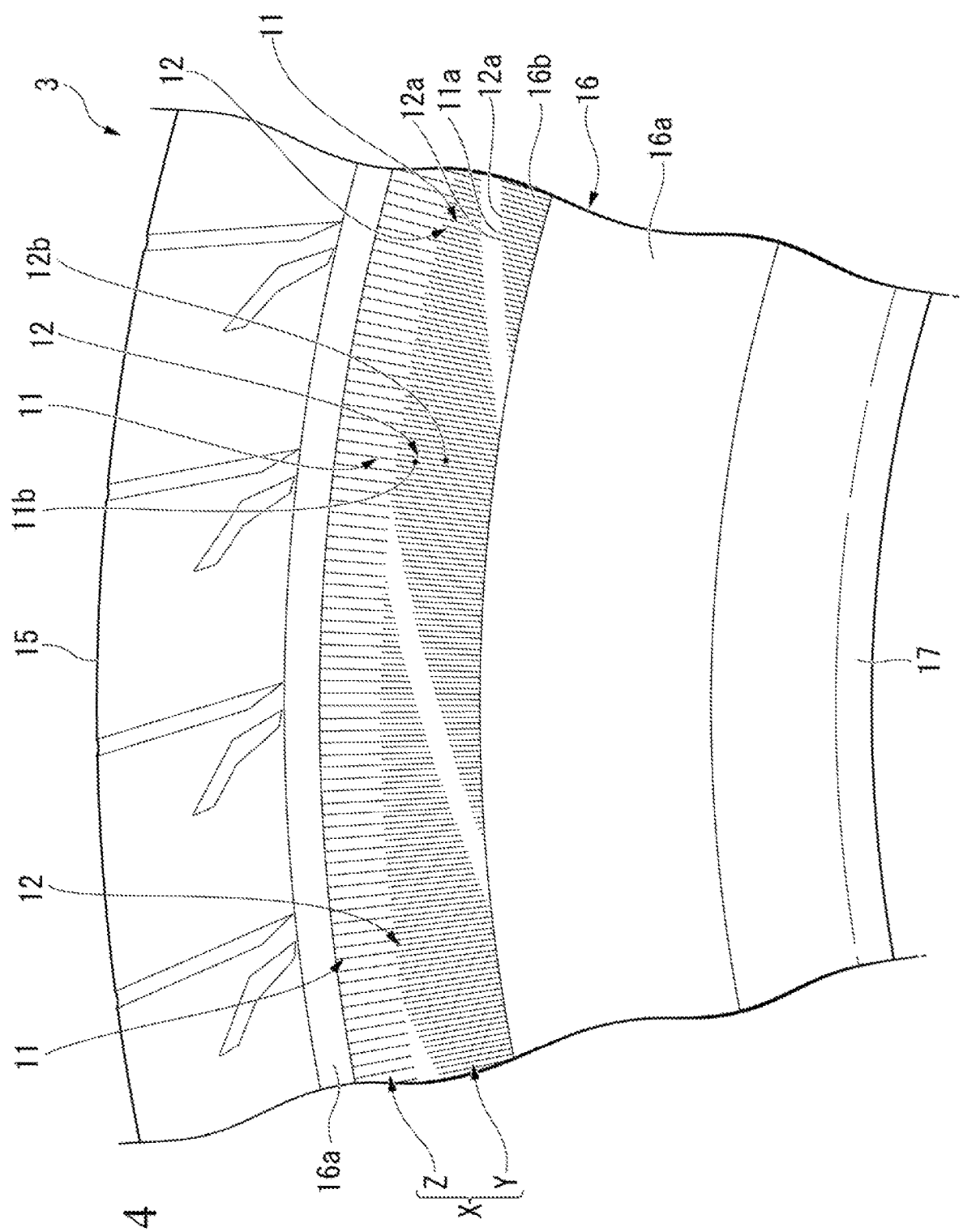

TIRE

CROSS REFERENCE TO RELATED APPLICATIONS

This application is a National Stage of International Application No. PCT/JP2020/019870 filed on May 20, 2020, claiming priority based on Japanese Patent Application No. 2019-103678 filed on Jun. 3, 2019.

TECHNICAL FIELD

The present invention relates to a tire.
Priority is claimed on Japanese Patent Application No. 2019-103678, filed Jun. 3, 2019, the content of which is incorporated herein by reference.

BACKGROUND ART

A tire disclosed in, for example, Patent Document 1 below, in which a plurality of first ridge parts extending in a tire radial direction and disposed at intervals in a tire circumferential direction and a plurality of second ridge parts disposed between the first ridge parts adjacent to each other in the tire circumferential direction are provided on an outer surface of a side wall part, the length of the second ridge part is shorter than the length of the first ridge part, and the second ridge part extends in a direction intersecting the first ridge part, is known in the related art.

In this tire, a decorative area in the outer surface of the side wall part, on which at least either the first ridge parts or the second ridge parts are provided, has a dense area in which both the first ridge parts and the second ridge parts are located, and a sparse area in which the first ridge parts face each other in the tire circumferential direction without interposing the second ridge part therebetween, thereby exhibiting a decorative effect.

CITATION LIST

Patent Document

[Patent Document 1]
Japanese Unexamined Patent Application, First Publication No. 2004-338655

SUMMARY OF INVENTION

Technical Problem

In the tire in the related art, since the second ridge part extends in the direction intersecting the first ridge part, there is a possibility that it may be difficult to provide grooves for forming the first ridge parts and the second ridge parts on an inner surface of a cavity of a vulcanizing mold of the tire with a high level of precision in relative positions, and it may be difficult to form the dense area on the outer surface of the side wall part with a high level of precision.

The present invention has been made in view of the above circumstances, and an object thereof is to provide a tire capable of forming a dense area and a sparse area on an outer surface of a side wall part with a high level of precision.

Solution to Problem

According to an aspect of the present invention, a tire includes a tread part that is located at an outer end portion in a tire radial direction, and side wall parts that extend inward in the tire radial direction from both end portions of the tread part in a tire width direction, in which first ridge parts and second ridge parts are provided on an outer surface of the side wall part so as to be disposed alternately in a tire circumferential direction, the first ridge part extending in the tire radial direction, and the second ridge part extending in the tire radial direction and having a central portion in the tire radial direction located on an inner side in the tire radial direction with respect to a central portion of the first ridge part in the tire radial direction, an outer end portion of the second ridge part in the tire radial direction is located on an outer side in the tire radial direction with respect to an inner end portion of the first ridge part in the tire radial direction, and a decorative area in the outer surface of the side wall part, on which at least either the first ridge parts or the second ridge parts are provided, includes a dense area in which the first ridge part and the second ridge part face each other in the tire circumferential direction, and a sparse area in which either the first ridge parts or the second ridge parts face each other in the tire circumferential direction without interposing the other therebetween.

Advantageous Effects of Invention

According to the present invention, the dense area and the sparse area can be formed on the outer surface of the side wall part with a high level of precision.

BRIEF DESCRIPTION OF DRAWINGS

FIG. 4 is a side view of an outer surface of a side wall part of a tire according to a third embodiment of the present invention as viewed from a tire width direction.

DESCRIPTION OF EMBODIMENTS

Hereinafter, a tire 1 according to a first embodiment of the present invention will be described with reference to the drawings.

Figure 1:
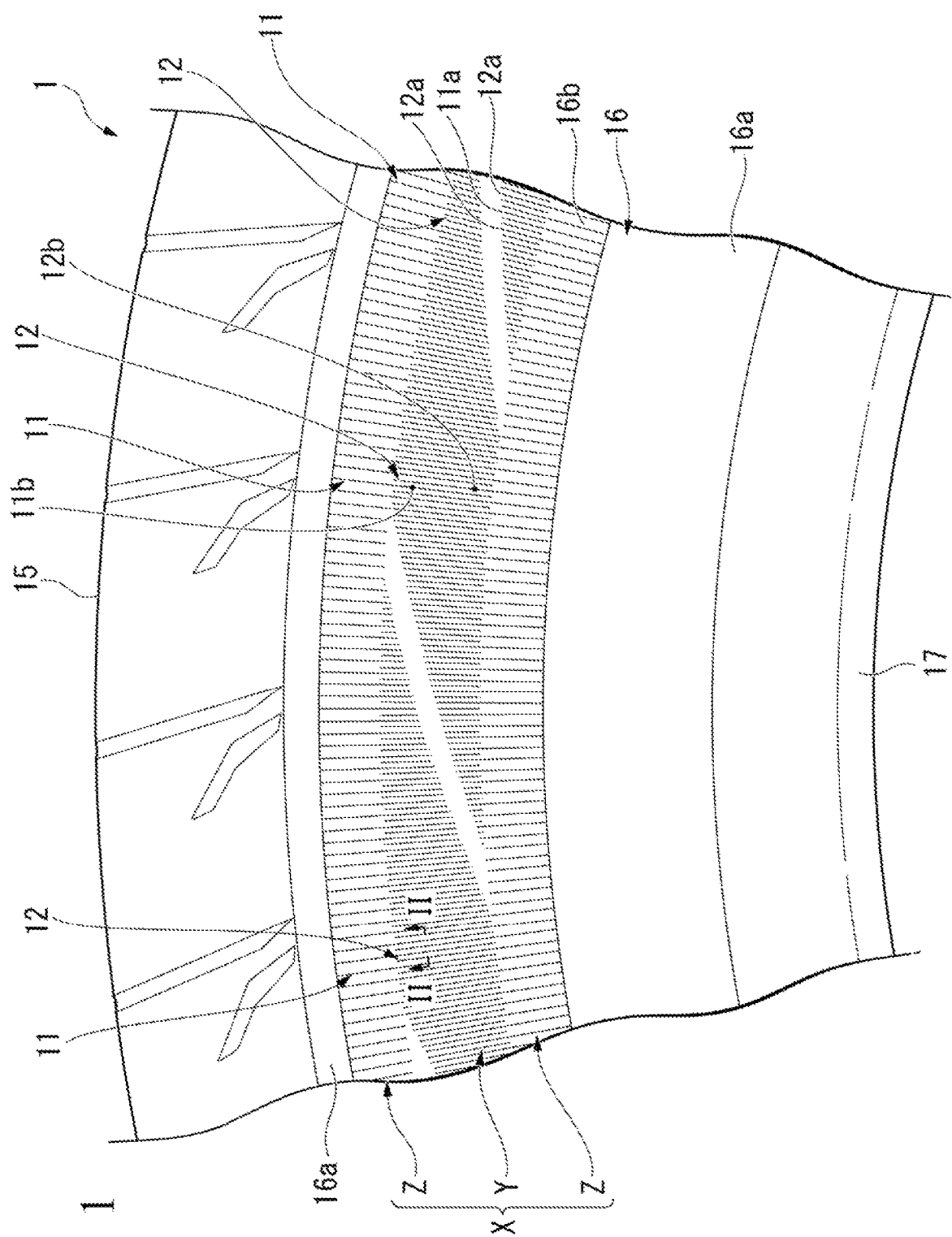
FIG. 1 is a side view of an outer surface of a side wall part of a tire according to a first embodiment of the present invention as viewed from a tire width direction.

As shown in FIG. 1, the tire 1 includes a tread part 15 located at an outer end portion in a tire radial direction, a pair of side wall parts 16 extending inward in the tire radial direction from both end portions of the tread part 15 in a tire width direction, and bead parts 17 connected to inner end portions of the side wall parts 16 in the tire radial direction. A bead core is embedded in each bead part 17. A belt is embedded in the tread part 15. A carcass ply is integrally embedded in the tread part 15, the side wall parts 16, and the bead parts 17. The carcass ply is folded back around the bead cores.

In the present embodiment, first ridge parts 11 and second ridge parts 12 are provided on an outer surface of the side wall part 16 so as to be disposed alternately in a tire circumferential direction. The first ridge part 11 and the second ridge part 12 extend in the tire radial direction. The plurality of the first ridge parts 11 and the plurality of the second ridge parts 12 are provided, and extend radially around the rotational center of the tire 1 when viewed in the tire width direction.

The first ridge part 11 and the second ridge part 12 have the same shape and the same size. The pitch interval between the first ridge parts 11 adjacent to each other in the tire circumferential direction is the same as the pitch interval between the second ridge parts 12 adjacent to each other in the tire circumferential direction.

The first ridge part 11 and the second ridge part 12 may be formed in different shapes and different sizes, or may be provided at different pitch intervals.

Figure 2:
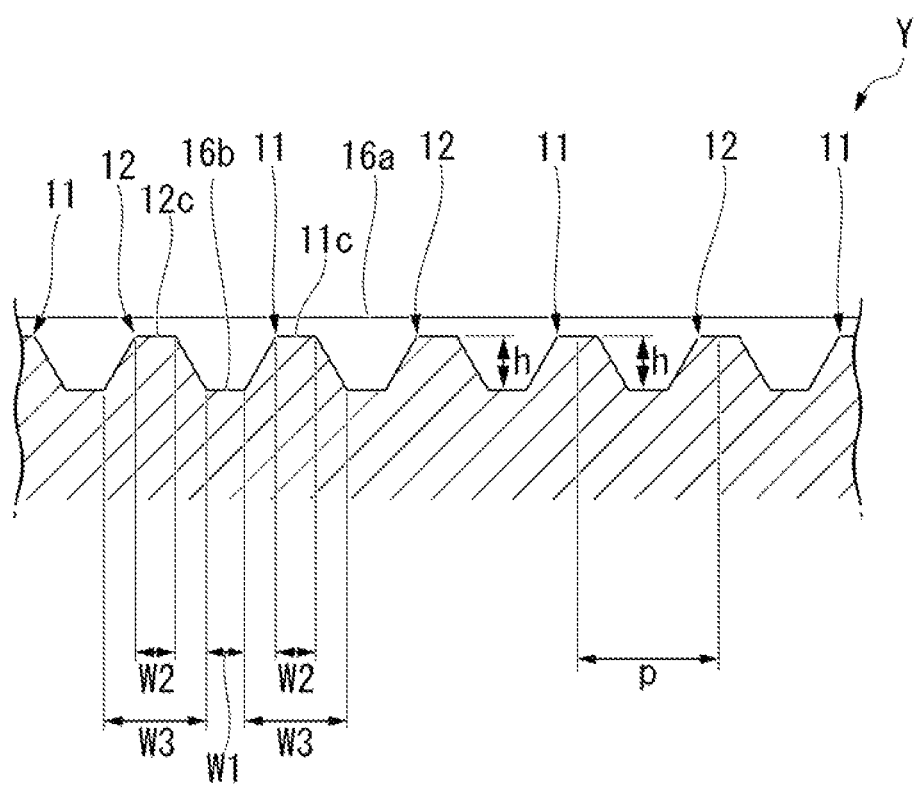
FIG. 2 is a cross-sectional view taken along the line II-II of FIG. 1.

A decorative area X in the outer surface of the side wall part 16, on which at least either the first ridge parts 11 or the second ridge parts 12 are provided, has a curved band shape extending in the tire circumferential direction when viewed in the tire width direction. In the illustrated example, the entire decorative area X is recessed, and the first ridge parts 11 and the second ridge parts 12 are formed on a bottom surface 16b of the decorative area X. The first ridge parts 11 and the second ridge parts 12 are provided over the entire decorative area X. As shown in FIG. 2, outer end surfaces 11c and 12c of the first ridge part 11 and the second ridge part 12 in the tire width direction are located on an inner side in the tire width direction with respect to an outer surface of a smooth portion 16a of the side wall part 16 located outside the decorative area X.

The decorative area X does not have to be recessed in the tire width direction. The outer end surfaces 11c and 12c of the first ridge part 11 and the second ridge part 12 in the tire width direction may be located at the same position in the tire width direction or may be located on an outer side in the tire width direction with respect to the outer surface of the smooth portion 16a of the side wall part 16 located outside the decorative area X.

As shown in FIG. 1, a central portion 12b of the second ridge part 12 in the tire radial direction is located on an inner side in the tire radial direction with respect to a central portion 11b of the first ridge part 11 in the tire radial direction. An outer end portion of the second ridge part 12 in the tire radial direction is located on an outer side in the tire radial direction with respect to an inner end portion of the first ridge part 11 in the tire radial direction.

With these configurations, the decorative area X in the outer surface of the side wall part 16 includes a dense area Y in which the first ridge parts 11 and the second ridge parts 12 face each other in the tire circumferential direction, and a sparse area Z in which either the first ridge parts 11 or the second ridge parts 12 face each other in the tire circumferential direction without interposing the other therebetween.

An outer end portion of the first ridge part 11 in the tire radial direction is located on the outer side in the tire radial direction or at the same position in the tire radial direction with respect to the outer end portion of the second ridge part 12 in the tire radial direction. In the illustrated example, the outer end portion of the first ridge part 11 in the tire radial direction is located on the outer side in the tire radial direction with respect to the outer end portion of the second ridge part 12 in the tire radial direction.

An inner end portion of the second ridge part 12 in the tire radial direction is located on the inner side in the tire radial direction or at the same position in the tire radial direction with respect to the inner end portion of the first ridge part 11 in the tire radial direction. In the illustrated example, the inner end portion of the second ridge part 12 in the tire radial direction is located on the inner side in the tire radial direction with respect to the inner end portion of the first ridge part 11 in the tire radial direction.

Outside portions in the tire radial direction of the first ridge parts 11 adjacent to each other in the tire circumferential direction face each other without interposing the second ridge part 12 therebetween in the tire circumferential direction, and inside portions in the tire radial direction of the second ridge parts 12 adjacent to each other in the tire circumferential direction face each other without interposing the first ridge part 11 therebetween in the tire circumferential direction.

Thus, the sparse area Z is disposed on both sides of the dense area Y in the tire radial direction. The dense area Y is located at a central portion of the decorative area X in the tire radial direction. The sizes in the tire radial direction of the sparse areas Z are equal to each other. The size in the tire radial direction of the dense area Y is larger than the size in the tire radial direction of each sparse area Z.

The sizes in the tire radial direction of the sparse areas Z may be different from each other, and the size in the tire radial direction of the dense area Y may be equal to or smaller than the size in the tire radial direction of each sparse area Z.

The outer end portion of the first ridge part 11 in the tire radial direction is located at an outer end portion of the decorative area X in the tire radial direction, and the inner end portion of the second ridge part 12 in the tire radial direction is located at an inner end portion of the decorative area X in the tire radial direction. The inner end portion of the first ridge part 11 in the tire radial direction is located on the outer side in the tire radial direction with respect to the inner end portion of the decorative area X in the tire radial direction and on the inner side in the tire radial direction with respect to the central portion of the decorative area X in the tire radial direction. The outer end portion of the second ridge part 12 in the tire radial direction is located on the inner side in the tire radial direction with respect to the outer end portion of the decorative area X in the tire radial direction and on the outer side in the tire radial direction with respect to the central portion of the decorative area X in the tire radial direction.

The central portion 11b of the first ridge part 11 in the tire radial direction faces the second ridge part 12 in the tire circumferential direction, and the central portion 12b of the second ridge part 12 in the tire radial direction faces the first ridge part 11 in the tire circumferential direction. That is, the central portions 11b and 12b of the first ridge part 11 and the second ridge part 12 in the tire radial direction are located in the dense area Y.

The central portions 11b and 12b of the first ridge part 11 and the second ridge part 12 in the tire radial direction may be located in the sparse area Z.

Recessed portions 11a and 12a are formed separately in the first ridge parts 11 and the second ridge parts 12 at positions located at least in the dense area Y and adjacent to each other in the tire circumferential direction, and the entirety of the recessed portions 11a and 12a exhibits at least one of a character, a figure, and a symbol when viewed in the tire width direction.

The recessed portions 11a and 12a are formed separately in the first ridge parts 11 and the second ridge parts 12 at positions limited to a portion located in the dense area Y, and the entirety of the recessed portions 11a and 12a exhibits a band shape which is provided over the entire area in the dense area Y in the tire radial direction, extends toward the outer side in the tire radial direction as it goes toward one side in the tire circumferential direction, and is curved in an arc shape of a protrusion toward the outer side in the tire radial direction, when viewed in the tire width direction. The plurality of recessed portions 11a and 12a exhibiting this band shape are provided in a plurality of areas located apart from each other in the dense area Y.

For example, the recessed portions 11a and 12a may be provided in at least one of the outer end portion, the inner end portion, and the central portion of the dense area Y in the tire radial direction. The recessed portions 11a and 12a may be provided in both the dense area Y and the sparse area Z. The shape of the entirety of the plurality of recessed portions 11a and 12a when viewed in the tire width direction is not limited to a band shape, and may be appropriately changed, such as a waveform shape.

The recessed portions 11a and 12a are formed over the entire portion in the tire width direction of the first ridge part 11 and the second ridge part 12. That is, bottom surfaces of the recessed portions 11a and 12a are flush with the bottom surface 16b of the decorative area X. The recessed portions 11a and 12a may be formed only in the outside portions in the tire width direction of the first ridge part 11 and the second ridge part 12.

One recessed portion 11a is formed in one first ridge part 11, and one recessed portion 12a is formed in one second ridge part 12. The plurality of recessed portions 11a may be formed in one first ridge part 11, and the plurality of recessed portions 12a may be formed in one second ridge part 12.

As shown in FIG. 2, in a longitudinal sectional view along the tire circumferential direction, each of the first ridge part 11 and the second ridge part 12 has a trapezoidal shape in which the width in the tire circumferential direction increases from the outer side to the inner side in the tire width direction. In the dense area Y, the first ridge part 11 and the second ridge part 12, which are adjacent to each other in the tire circumferential direction, are disposed to be separated from each other in the tire circumferential direction over the entire area in the tire width direction, and the first ridge parts 11 and the second ridge parts 12 are alternately provided in the tire circumferential direction with the bottom surface 16b of the decorative area X interposed therebetween.

In the dense area Y, the width w1 in the tire circumferential direction of the bottom surface 16b of the decorative area X, which is located between the first ridge part 11 and the second ridge part 12, is smaller than the width w2 in the tire circumferential direction of each of the outer end surfaces 11c and 12c of the first ridge part 11 and the second ridge part 12 in the tire width direction.

The width w1 is, for example, 0 mm or more and 0.4 mm or less. The width w2 is, for example, 0 mm or more and 0.7 mm or less. In the illustrated example, the width w1 is about 0.2 mm, and the width w2 is about 0.38 mm.

The width w1 in the tire circumferential direction of the bottom surface 16b of the decorative area X may be set to be equal to or larger than the width w2 in the tire circumferential direction of each of the outer end surfaces 11c and 12c of the first ridge part 11 and the second ridge part 12 in the tire width direction. The outer end portion of each of the first ridge part 11 and the second ridge part 12 in the tire width direction may be an angular portion pointed toward the outer side in the tire width direction, and in the dense area Y, the first ridge part 11 and the second ridge part 12 adjacent to each other in the tire circumferential direction may be disposed so as to be continuous in the tire circumferential direction without passing through the bottom surface 16b of the decorative area X. That is, the widths w1 and w2 described above may be 0 mm.

In the dense area Y, the pitch interval p in the tire circumferential direction between the first ridge part 11 and the second ridge part 12 adjacent to each other in the tire circumferential direction is half of the pitch interval between the first ridge parts 11 adjacent to each in the tire circumferential direction and of the pitch interval between the second ridge parts 12 adjacent to each other in the tire circumferential direction. In the dense area Y, the pitch interval p in the tire circumferential direction between the first ridge part 11 and the second ridge part 12 adjacent to each other in the tire circumferential direction is, for example, 0.17 mm or more and 1.79 mm or less.

The width w2 of each of the outer end surfaces 11c and 12c of the first ridge part 11 and the second ridge part 12 in the tire width direction is equal to or less than the height h in the tire width direction of each of the first ridge part 11 and the second ridge part 12. The height h is, for example, 0.15 mm or more and 0.4 mm or less. In the illustrated example, the height h is about 0.3 mm. The width w2 may be larger than the height h.

In the dense area Y, the pitch interval p in the tire circumferential direction between the first ridge part 11 and the second ridge part 12 adjacent to each other in the tire circumferential direction is 0.03 times or more and 18.07 times or less of the width w3 in the tire circumferential direction at the inner end in the tire width direction of each of the first ridge part 11 and the second ridge part 12. The width w3 in the tire circumferential direction at the inner end in the tire width direction of each of the first ridge part 11 and the second ridge part 12 is, for example, 0.23 mm or more and 1.78 mm or less.

The width w3 is 0.57 times or more and 8.90 times or less of the height h in the tire width direction of each of the first ridge part 11 and the second ridge part 12.

As described above, according to the tire 1 of the present embodiment, since the central portion 12b of the second ridge part 12 in the tire radial direction is located on the inner side in the tire radial direction with respect to the central portion 11b of the first ridge part 11 in the tire radial direction, and the outer end portion of the second ridge part 12 in the tire radial direction is located on the outer side in the tire radial direction with respect to the inner end portion of the first ridge part 11 in the tire radial direction, both the dense area Y and the sparse area Z are provided in the decorative area X, so that the decorative effect can be exhibited.

Since both the first ridge part 11 and the second ridge part 12 extend in the tire radial direction, grooves for forming the first ridge parts 11 and the second ridge parts 12 are easily provided on an inner surface of a cavity of a vulcanizing mold of the tire 1 with a high level of precision in relative positions, and the dense area Y and the sparse area Z can be formed on the outer surface of the side wall part 16 with a high level of precision.

Since the entirety of the recessed portions 11a and 12a, which are formed separately in the first ridge parts 11 and the second ridge parts 12 at positions located at least in the dense area Y and adjacent to each other in the tire circumferential direction, exhibits at least one of a character, a figure, and a symbol when viewed in the tire width direction, the decorative effect can be reliably exhibited in the decorative area X.

Since the outer end portion of the first ridge part 11 in the tire radial direction is located on the outer side in the tire radial direction with respect to the outer end portion of the second ridge part 12 in the tire radial direction, and the inner end portion of the second ridge part 12 in the tire radial direction is located on the inner side in the tire radial direction with respect to the inner end portion of the first ridge part 11 in the tire radial direction, the sparse area Z is disposed on both sides of the dense area Y in the tire radial direction, so that the decorative effect can be reliably exhibited in the decorative area X.

Since the dense area Y is located at the central portion of the decorative area X in the tire radial direction, the decorative effect can be reliably exhibited in the decorative area X.

Next, a tire 2 according to a second embodiment of the present invention will be described with reference to FIG. 3.

In the second embodiment, the same parts as the components in the first embodiment are denoted by the same reference numerals, the description thereof will be omitted, and only the different points will be described.

Figure 3:
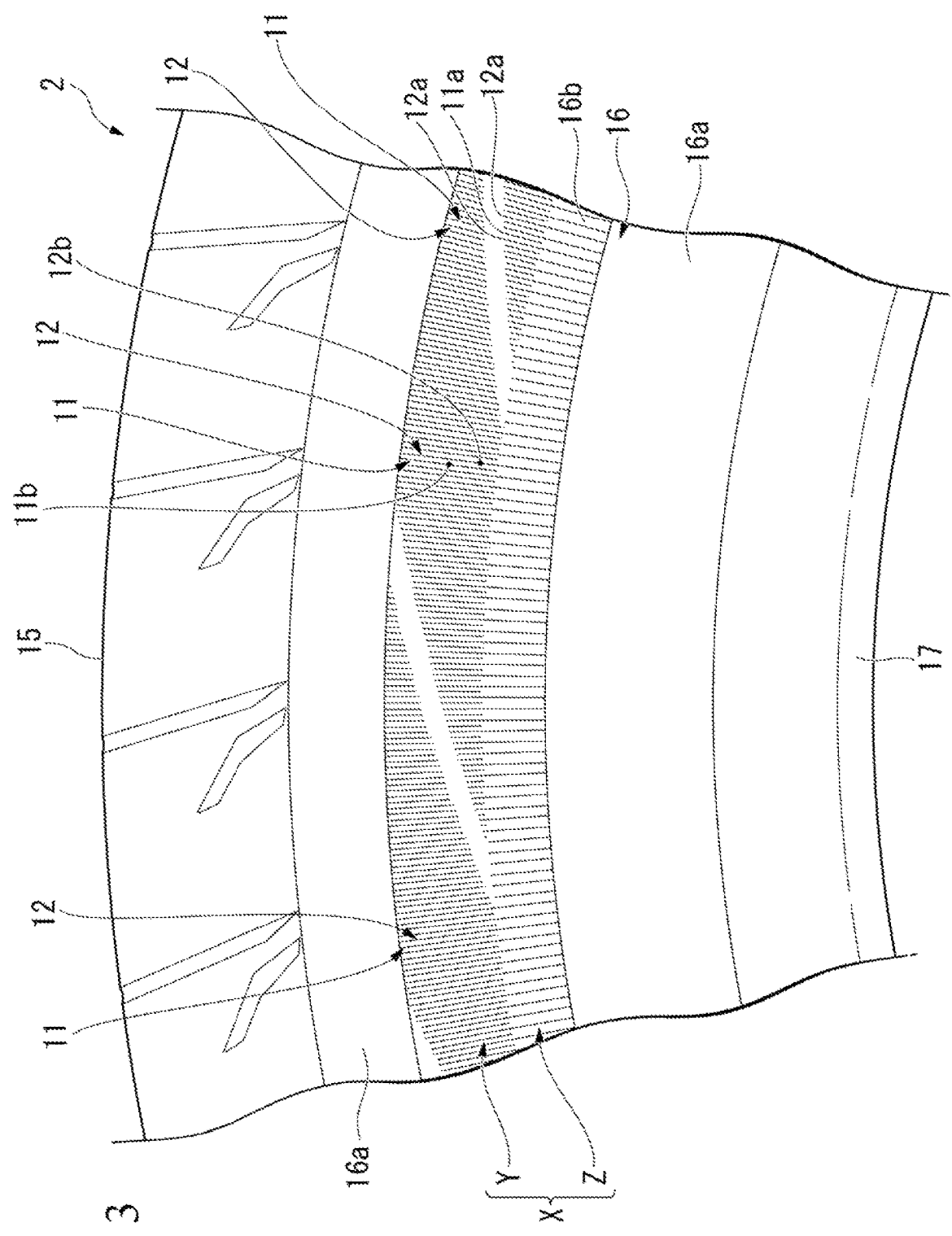
FIG. 3 is a side view of an outer surface of a side wall part of a tire according to a second embodiment of the present invention as viewed from a tire width direction.

In the present embodiment, as shown in FIG. 3, the length in the tire radial direction of the second ridge part 12 is longer than the length in the tire radial direction of the first ridge part 11, and the second ridge part 12 is provided over the entire area of the decorative area X in the tire radial direction.

Thus, positions in the tire radial direction of the outer end portions of the first ridge part 11 and the second ridge part 12 in the tire radial direction are equal to each other, and a part of the decorative area X including the central portion and the outer end portion of the decorative area X in the tire radial direction is defined as the dense area Y, and a part of the decorative area X located on the inner side in the tire radial direction with respect to the dense area Y and including the inner end portion of the decorative area X in the tire radial direction is defined as the sparse area Z.

Also in the present embodiment, the same operation and effect as those in the above-described embodiment are achieved.

Next, a tire 3 according to a third embodiment of the present invention will be described with reference to FIG. 4.

In the third embodiment, the same parts as the components in the first embodiment are denoted by the same reference numerals, the description thereof will be omitted, and only the different points will be described.

In the present embodiment, as shown in FIG. 4, the length in the tire radial direction of the first ridge part 11 is longer than the length in the tire radial direction of the second ridge part 12, and the first ridge part 11 is provided over the entire area of the decorative area X in the tire radial direction.

Thus, positions in the tire radial direction of the inner end portions of the first ridge part 11 and the second ridge part 12 in the tire radial direction are equal to each other, and a part of the decorative area X including the central portion and the inner end portion of the decorative area X in the tire radial direction is defined as the dense area Y, and a part of the decorative area X located on the outer side in the tire radial direction with respect to the dense area Y and including the outer end portion of the decorative area X in the tire radial direction is defined as the sparse area Z.

Also in the present embodiment, the same operation and effect as those in the above-described embodiment are achieved.

The technical scope of the present invention is not limited to the above-mentioned embodiment, and various modifications can be made without departing from the scope of the present invention.

In the first embodiment and the third embodiment, the inner end portion of the second ridge part 12 in the tire radial direction may be located on the outer side in the tire radial direction with respect to the inner end portion of the first ridge part 11 in the tire radial direction, the outside portions in the tire radial direction of the first ridge parts 11 adjacent to each other in the tire circumferential direction may face each other without interposing the second ridge part 12 therebetween in the tire circumferential direction, and the inside portions in the tire radial direction thereof may face each other without interposing the second ridge part 12 therebetween in the tire circumferential direction.

In this configuration, the outer end portion of the second ridge part 12 in the tire radial direction may be located on the inner side in the tire radial direction or on the outer side in the tire radial direction with respect to the central portion 11b of the first ridge part 11 in the tire radial direction. That is, the central portion 11b of the first ridge part 11 in the tire radial direction may be located in the sparse area Z or in the dense area Y.

In the first embodiment and the second embodiment, the outer end portion of the first ridge part 11 in the tire radial direction may be located on the inner side in the tire radial direction with respect to the outer end portion of the second ridge part 12 in the tire radial direction, the outside portions in the tire radial direction of the second ridge parts 12 adjacent to each other in the tire circumferential direction may face each other without interposing the first ridge part 11 therebetween in the tire circumferential direction, and the inside portions in the tire radial direction thereof may face each other without interposing the first ridge part 11 therebetween in the tire circumferential direction.

In this configuration, the inner end portion of the first ridge part 11 in the tire radial direction may be located on the outer side in the tire radial direction or on the inner side in the tire radial direction with respect to the central portion 12b of the second ridge part 12 in the tire radial direction. That is, the central portion 12b of the second ridge part 12 in the tire radial direction may be located in the sparse area Z or in the dense area Y.

Moreover, the components of the above-described embodiment can be appropriately substituted with well-known components without departing from the scope of the present invention, and the above-described modification examples may be appropriately combined with each other.

In the present invention, since the central portion of the second ridge part in the tire radial direction is located on the inner side in the tire radial direction with respect to the central portion of the first ridge part in the tire radial direction, and the outer end portion of the second ridge part in the tire radial direction is located on the outer side in the tire radial direction with respect to the inner end portion of the first ridge part in the tire radial direction, both the dense area and the sparse area are provided in the decorative area, so that the decorative effect can be exhibited.

Since both the first ridge part and the second ridge part extend in the tire radial direction, grooves for forming the first ridge parts and the second ridge parts are easily provided on an inner surface of a cavity of a vulcanizing mold of the tire with a high level of precision in relative positions, and the dense area and the sparse area can be formed on the outer surface of the side wall part with a high level of precision.

Here, recessed portions may be formed separately in the first ridge parts and the second ridge parts at positions located at least in the dense area and adjacent to each other in the tire circumferential direction, and an entirety of the recessed portions may exhibit at least one of a character, a figure, and a symbol when viewed in the tire width direction.

In this case, since the entirety of the recessed portions, which are formed separately in the first ridge parts and the second ridge parts at positions located at least in the dense area and adjacent to each other in the tire circumferential direction, exhibits at least one of a character, a figure, and a symbol when viewed in the tire width direction, the decorative effect can be reliably exhibited in the decorative area.

In addition, the outer end portion of the first ridge part in the tire radial direction may be located on the outer side in the tire radial direction with respect to the outer end portion of the second ridge part in the tire radial direction, and the inner end portion of the second ridge part in the tire radial direction may be located on the inner side in the tire radial direction with respect to the inner end portion of the first ridge part in the tire radial direction.

In this case, since the outer end portion of the first ridge part in the tire radial direction is located on the outer side in the tire radial direction with respect to the outer end portion of the second ridge part in the tire radial direction, and the inner end portion of the second ridge part in the tire radial direction is located on the inner side in the tire radial direction with respect to the inner end portion of the first ridge part in the tire radial direction, the sparse area is disposed on both sides of the dense area in the tire radial direction, so that the decorative effect can be reliably exhibited in the decorative area.

In addition, the dense area may be located at the central portion of the decorative area in the tire radial direction.

In this case, since the dense area is located at the central portion of the decorative area in the tire radial direction, the decorative effect can be reliably exhibited in the decorative area.

INDUSTRIAL APPLICABILITY

By applying the tire of the present application to a relevant field, it is possible to form the dense area and the sparse area on the outer surface of the side wall part with a high level of precision.

REFERENCE SIGNS LIST 1, 2, 3: Tire
11: First ridge part
11a, 12a: Recessed portion
11b: Central portion of first ridge part in tire radial direction
12: Second ridge part
12b: Central portion of second ridge part in tire radial direction
16: Side wall part
X: Decorative area
Y: Dense area
Z: Sparse area

The invention claimed is:

1. A tire comprising:
a tread part that is located at an outer end portion in a tire radial direction; and
side wall parts that extend inward in the tire radial direction from both end portions of the tread part in a tire width direction,
wherein first ridge parts and second ridge parts are provided on an outer surface of each side wall part of the side wall parts so as to be disposed alternately in a tire circumferential direction, each of the first ridge parts extending in the tire radial direction, and each of the second ridge parts extending in the tire radial direction and having a central portion in the tire radial direction located on an inner side in the tire radial direction with respect to a central portion of each of the first ridge parts in the tire radial direction,
an outer end portion of a second ridge part of the second ridge parts in the tire radial direction is located on an outer side in the tire radial direction with respect to an inner end portion of a first ridge part of the first ridge parts in the tire radial direction,
a decorative area in the outer surface of each side wall part of the side wall parts, on which the first ridge parts and the second ridge parts are provided, includes a dense area in which the first ridge part and the second ridge part face each other in the tire circumferential direction, and a sparse area in which either the first ridge parts face each other in the tire circumferential direction without interposing the second ridge parts therebetween or the second ridge parts face each other in the tire circumferential direction without interposing the first ridge parts therebetween,
an outer end portion of the first ridge part in the tire radial direction is located on the outer side in the tire radial direction with respect to the outer end portion of the second ridge part in the tire radial direction,
an inner end portion of the second ridge part in the tire radial direction is located on the inner side in the tire radial direction with respect to the inner end portion of the first ridge part in the tire radial direction,
an entire length of each of the first ridge parts and an entire length of each of the second ridge parts extend linearly and radially around a rotational center of the tire, and
an outer end of each of the first ridge parts in the tire radial direction is located on an outer edge of the decorative area in the tire radial direction and an inner end of each of the second ridge parts in the tire radial direction is located on an inner edge of the decorative area in the tire radial direction.

2. The tire according to claim 1,
wherein recessed portions are formed in the first ridge parts and the second ridge parts at positions located at least in the dense area and adjacent to each other in the tire circumferential direction, and an entirety of the recessed portions exhibits at least one of a character, a figure, and a symbol when viewed in the tire width direction.

3. The tire according to claim 1,
wherein the dense area is located at a central portion of the decorative area in the tire radial direction.

4. The tire according to claim 1,
wherein in the dense area, a width w1 in the tire circumferential direction of a bottom surface of the decorative area, which is located between the first ridge part and the second ridge part adjacent to each other in the tire circumferential direction, is smaller than a width w2 in the tire circumferential direction of the first ridge part, and
the width w1 is 0 mm or more and 0.4 mm or less, and the width w2 is 0 mm or more and 0.7 mm or less.

5. The tire according to claim 1,
wherein in the dense area, a pitch interval in the tire circumferential direction between the first ridge part and the second ridge part adjacent to each other in the tire circumferential direction is half of a pitch interval between the first ridge parts adjacent to each other in the tire circumferential direction, and the pitch interval in the tire circumferential direction between the first ridge part and the second ridge part adjacent to each other in the tire circumferential direction is half of a pitch interval between the second ridge parts adjacent to each other in the tire circumferential direction.

6. The tire according to claim 1,
wherein a width in the tire circumferential direction of the first ridge part is equal to or less than a height in the tire width direction of the first ridge part, and a width in the tire circumferential direction of the second ridge part is equal to or less than a height in the tire width direction of the second ridge part.

7. The tire according to claim 1,
wherein in the dense area, a pitch interval in the tire circumferential direction between the first ridge part and the second ridge part adjacent to each other in the tire circumferential direction is 0.03 times or more and 18.07 times or less of a width in the tire circumferential direction at an inner end in the tire width direction of each of the first ridge part and the second ridge part.

8. The tire according to claim 1,
wherein recessed portions are formed in the first ridge parts and the second ridge parts at positions located in the dense area and adjacent to each other in the tire circumferential direction, an entirety of the recessed portions exhibits at least one of a character, a figure, and a symbol when viewed in the tire width direction, and the recessed portions are formed at positions limited to a portion located in the dense area and are not formed in the sparse area.

9. The tire according to claim 1,
wherein a size in the tire radial direction of the dense area is larger than a size in the tire radial direction of the sparse area.

10. The tire according to claim 1,
wherein each of the first ridge parts and each of the second ridge parts extend radially around a rotational center of the tire when viewed in the tire width direction.

\* \* \* \* \*